(12) United States Patent
Yang et al.

(10) Patent No.: US 11,696,229 B2
(45) Date of Patent: *Jul. 4, 2023

(54) POWER SAVING MECHANISM FOR MU-MIMO TRANSMISSIONS

(71) Applicant: INTEL CORPORATION, Santa Clara, CA (US)

(72) Inventors: Ou Yang, Santa Clara, CA (US);
Carlos Cordeiro, Portland, OR (US);
Laurent Cariou, Portland, OR (US);
Chittabrata Ghosh, Fremont, CA (US);
Solomon Trainin, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/468,289

(22) Filed: Sep. 7, 2021

(65) Prior Publication Data
US 2021/0410064 A1    Dec. 30, 2021

Related U.S. Application Data

(63) Continuation of application No. 16/786,638, filed on Feb. 10, 2020, now Pat. No. 11,115,925, which is a (Continued)

(51) Int. Cl.
*H04B 1/38* (2015.01)
*H04W 52/02* (2009.01)
*H04B 7/0452* (2017.01)

(52) U.S. Cl.
CPC ...... *H04W 52/0216* (2013.01); *H04B 7/0452* (2013.01); *H04W 52/0219* (2013.01); *Y02D 30/70* (2020.08)

(58) Field of Classification Search
CPC .......... H04W 52/0219; H04W 52/0216; H04B 7/0452; Y02D 70/142; Y02D 70/1262; Y02D 70/1224; Y02D 70/1264; Y02D 70/144; Y02D 70/146; Y02D 70/1242; Y02D 70/1244; Y02D 70/1246; Y02D 70/21; Y02D 70/166
See application file for complete search history.

(56) References Cited

U.S. PATENT DOCUMENTS 9,036,478 B2 * 5/2015 Torab Jahromi ........ H04L 69/02
                                                    370/235
9,345,040 B2 * 5/2016 Lu ......................... H04W 72/12
(Continued)

*Primary Examiner* — Nhan T Le
(74) *Attorney, Agent, or Firm* — KDW Firm PLLC

(57) ABSTRACT

Techniques for power saving by remote wireless mobile devices are provided, in particular by stations (STAs) during downlink (DL) multiple-user multiple-input and multiple-output (MU-MIMO) transmissions in an Institute of Electrical and Electronics Engineers (IEEE) 802.11ay network when reverse direction (RD) transmissions are either enabled and not enabled. Various embodiments enable each STA in a group of STAs to determine an order in which the STAs are requested to send a block acknowledgement (BACK) and which STAs will be granted an RD transmission. Further, a duration of each RD transmission is provided to each STA. Based on the provided information, each STA can determine times to enter a power saving mode. Other embodiments are described and claimed.

26 Claims, 8 Drawing Sheets

Related U.S. Application Data continuation of application No. 15/712,101, filed on Sep. 21, 2017, now Pat. No. 10,568,027, which is a continuation of application No. 15/390,376, filed on Dec. 23, 2016, now Pat. No. 9,794,879.

(56) References Cited

U.S. PATENT DOCUMENTS

| | | | |
|---|---|---|---|
| 9,794,879 B1* | 10/2017 | Yang | H04W 52/0216 |
| 10,568,027 B2* | 2/2020 | Yang | H04W 52/0219 |
| 11,115,925 B2* | 9/2021 | Yang | H04B 7/0452 |

* cited by examiner

POWER SAVING MECHANISM FOR MU-MIMO TRANSMISSIONS

CROSS-REFERENCE TO RELATED APPLICATIONS

This application is a continuation of, claims the benefit of and priority to previously filed U.S. patent application Ser. No. 16/786,638 filed Feb. 10, 2020, entitled "POWER SAVING MECHANISM FOR MU-MIMO TRANSMISSIONS", which is a continuation of, claims the benefit of and priority to previously filed U.S. patent application Ser. No. 15/712,101 filed Sep. 21, 2017, entitled "POWER SAVING MECHANISM FOR MU-MIMO TRANSMISSIONS", which is a continuation of, claims the benefit of and priority to previously filed U.S. patent application Ser. No. 15/390,376 filed Dec. 23, 2016, entitled "POWER SAVING MECHANISM FOR MU-MIMO TRANSMISSIONS", which are hereby incorporated by reference in their entireties.

TECHNICAL FIELD

Embodiments described herein generally relate to wireless communications between devices in wireless networks.

BACKGROUND

Many conventional wireless systems do not provide opportunities for remote mobile devices to enter power saving modes. For example, currently, the Institute of Electrical and Electronics Engineers (IEEE) 802.11ay standard does not provide for power saving during downlink (DL) multiple-user multiple-input and multiple-output (MU-MIMO) transmissions. Accordingly, new techniques for proving power saving during DL MU-MIMO transmissions, with and without reverse direction (RD) transmission allowed, may be needed.

DETAILED DESCRIPTION

Figure 1:
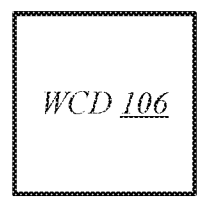
FIG. 1 illustrates an embodiment of a first operating environment.
Figure 1:
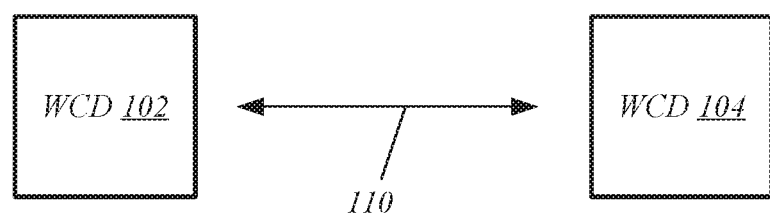
Figure 1:
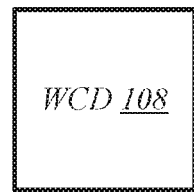

Various embodiments may be generally directed to power saving by remote wireless mobile devices, in particular by stations (STAs) during downlink (DL) multiple-user multiple-input and multiple-output (MU-MIMO) transmissions in an Institute of Electrical and Electronics Engineers (IEEE) 802.11ay network when reverse direction (RD) transmissions are either enabled and not enabled. Various embodiments enable each STA in a group of STAs to determine an order in which the STAs are requested to send a block acknowledgement (BACK) and which STAs will be granted an RD transmission. Further, a duration of each RD transmission is provided to each STA. Based on the provided information, each STA can determine times to enter a power saving mode. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Various embodiments herein are generally directed to wireless communications systems. Some embodiments are particularly directed to wireless communications over 31.8 GHz and/or 60 GHz frequencies. Various such embodiments may involve wireless communications performed according to one or more standards for 60 GHz wireless communications and/or wireless communications over 31.8 GHz. For example, some embodiments may involve wireless communications performed according to one or more Wireless Gigabit Alliance ("WiGig")/Institute of Electrical and Electronics Engineers (IEEE) 802.11ad standards, such as IEEE 802.11ad-2012, including their predecessors, revisions, progeny, and/or variants. Various embodiments may involve wireless communications performed according to one or more "next-generation" 60 GHz ("NG60") wireless local area network (WLAN) communications standards, such as the IEEE 802.11ay standard that is currently under development. Some embodiments may involve wireless communications performed according to one or more millimeter-wave (mmWave) wireless communication standards. It is worthy of note that the term "60 GHz" (or any specific frequency), as it is employed in reference to various wireless communications devices, wireless communications frequencies, and wireless communications standards herein, is not intended to specifically denote a frequency of exactly 60 GHz (or any other specific frequency), but rather is intended to generally refer to frequencies in, or near, the 57 GHz to 64 GHz frequency band or any nearby unlicensed band. The embodiments are not limited in this context.

In general, various embodiments herein may involve millimeter-wave communications systems. Various embodiments herein may involve systems operating according to any known wireless standard or protocol or any wireless standard or protocol under development including, but not limited to, IEEE 802.11ad, IEEE 802.11ay, and any 5G system.

Various embodiments may additionally or alternatively involve wireless communications according to one or more other wireless communication standards. Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in some embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Further examples of wireless communications technologies and/or standards that may be used in various embodiments may include—without limitation—other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11af, and/or IEEE 802.11ah standards, High-Efficiency Wi-Fi standards developed by the IEEE 802.11 High Efficiency WLAN (HEW) Study Group and/or IEEE 802.11 Task Group (TG) ax, Wi-Fi Alliance (WFA) wireless communication standards such as Wi-Fi, Wi-Fi Direct, Wi-Fi Direct Services, WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above. The embodiments are not limited to these examples.

FIG. 1 illustrates an exemplary operating environment 100 such as may be representative of various embodiments in which techniques for power saving are implemented. The operating environment 100 can include a wireless communication device (WCD) 102, a WCD 104, a WCD 106, and a WCD 108. The WCDs 102-108 can communicate with one another wirelessly. As an example, the WCD 102 and the WCD 104 can communicate over a wireless communications interface 110. The wireless communications interface 110 can be, for example, a wireless interface for any of the wireless networks or standards described herein including, for example, a communication standard including an IEEE 802.11 standard such as, for example, 802.11ad or 802.11ay, or a 5G communication standard. In various embodiments, the wireless interface 110 may operate within a 60 GHz frequency band and/or any band over 31.8 GHz. In various embodiments, the wireless interface 110 can be a millimeter-wave communication interface. The same wireless interface 110 can be used for communications between any of the WCDs 102-108.

In various embodiments, at least one of the WCDs 102-108 may operate as a station (STA) and at least one of the WCDs 102-108 may operate as a personal basic service set (PBSS) control point (PCP) or infrastructure basic service set (BSS) access point (AP). One or more of the WCDs 102-108 can be, for example, a mobile computing device. As an example, the WCDs 102-108 can be any mobile computing device capable of communicating wirelessly over one or more wireless communication networks. In various embodiments, at least one of the WCDs 102-104 can be a user equipment (UE) and at least one of the WCDs 102-104 can be a cellular base station such as, for example, an evolved node B (eNB).

In various embodiments described herein, the WCD 102 can be considered to be an AP/PCP (e.g., AP/PCP 102) and the other WCDs 104-108 can be considered to be STAs (e.g., STAs 104-108). Further, the AP/PCP 102 and the STAs 104-108 can operate as part of an IEEE 802.11ay communication system of which the operating environment 100 is a part such that the communications interface 106 operates according to IEEE 802.11ay. Additionally, the STAs 104-108 can be multiple-user multiple-input and multiple-output (MU-MIMO) STAs and can operate within an 802.11ay network that supports reverse direction (RD) for downlink (DL) MU-MIMO as described in U.S. Appl. No. 62/380,672, filed on Aug. 29, 2016 and U.S. Appl. No. 62/363,596, filed on Jul. 18, 2016, both of which are hereby incorporated by reference in their entirety. The STAs 104-108 can represent an MU-MIMO group of STAs. For simplicity, three STAs 104-108 are shown in FIG. 1 for simplicity but the operating environment 100 is not so limited as any number of STAs can operate as part of a MU-MIMO group in relation to the AP/PCP 102. The AP/PCP 102 and the STAs 104-108 can implement the power saving mode techniques described herein. The embodiments are not limited in this context.

Figure 2:
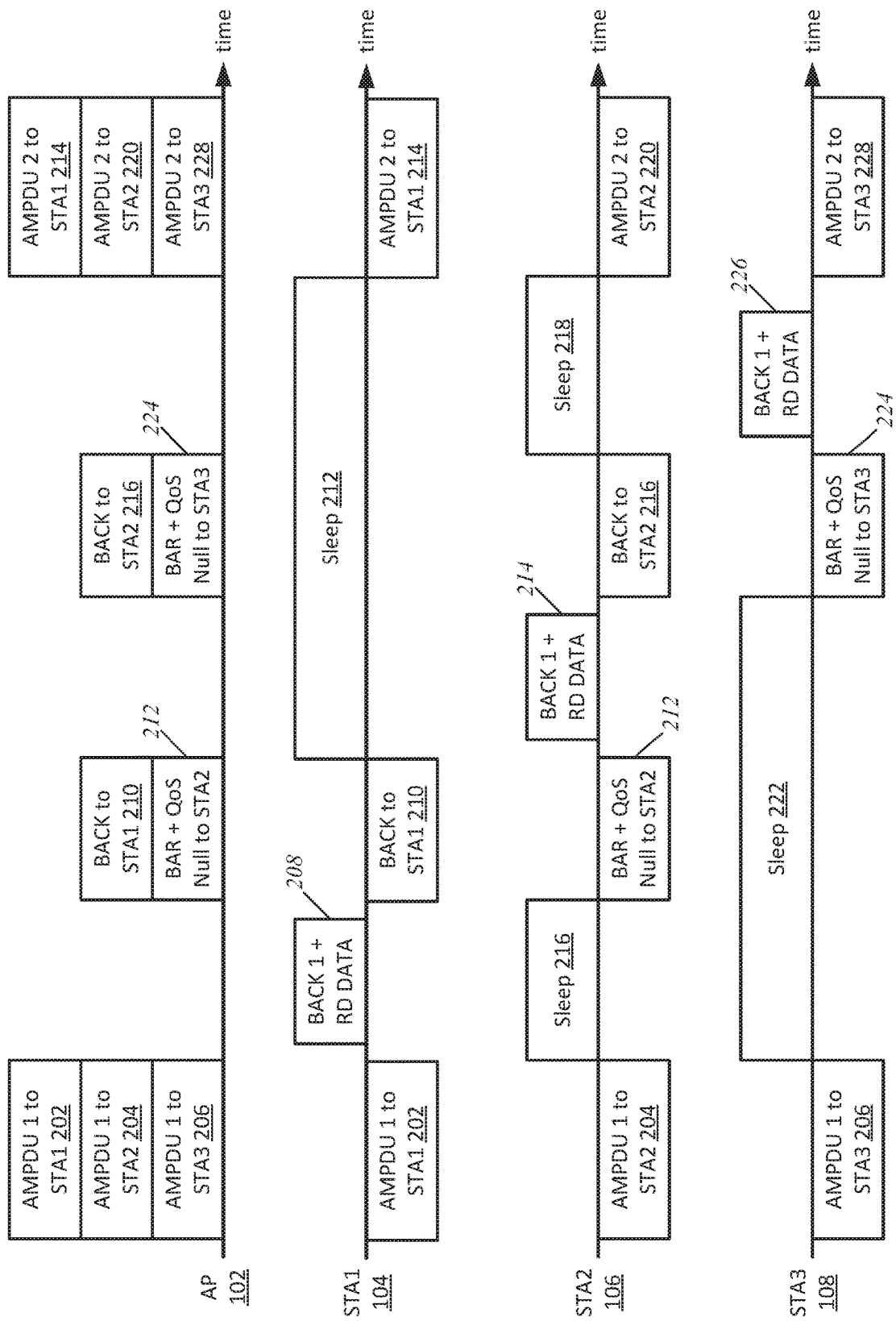
FIG. 2 illustrates an exemplary communication flow between elements depicted in FIG. 1.

FIG. 2 illustrates opportunities for entering a power saving mode during an RD communication flow between the AP/PCP 102 and the STAs 104-108. As shown in FIG. 2, STA "1" can be considered to be STA 104, STA "2" can be considered to be STA 106, and STA "3" can be considered to be STA 108. STA 1 can represent the first STA to send a Block Acknowledgement (BlockACK) to the AP 102 after receiving a first MU PHY layer convergence procedure (PLCP) protocol data unit (PPDU), STA 3 can represent the last STA to send a BlockACK in response to the first MU PPDU, and STA2 can represent any STA between the first and last STA to send a BlockAck in response to the MU PPDU.

FIG. 2 illustrates the communications and/or information transmitted and received by the AP 102 and the STAs 104-108 over time. For example, for each timeline shown, transmitted information is represented by blocks positioned above the timelines and received information is represented by blocks positioned beneath the timelines. For simplicity, information transmitted by the STAs 104-108 and received by the AP 102 is not shown for simplicity. FIG. 2 shows situations in which the STAs 104-108 within an MU-MIMO group may enter power saving mode during the DL MU-MIMO transmissions.

As shown in FIG. 2, the AP 102 transmits an aggregated medium access control (MAC) protocol data unit (AMPDU) 202 to STA 104, an AMPDU 204 to STA 106, and an AMPDU 206 to STA 108. The AMPDUs 202-206 are received by the STAs 104-106, respectively. In response to receiving the AMPDU 202, the STA 104 can be requested to approximately immediately send a BlockACK 208 in response. In combination with the BlockACK 208, the STA 104 can send any RD data if granted RD data from the AP 102 (BlockACK and RD data shown together as "BACK 1+RD DATA" element 208). The STA 104 can then receive a BlockACK 210 from the AP 102. As shown by the timeline for STA 104, STA 104 can be active for (1) receiving the AMPDU 202 (e.g., an MU PPDU), (2) sending its BlockACK and RD data 208 if granted RD, and (3) receiving the following BlockACK 210 from the AP 102 if its RD data requires an acknowledgement. Subsequent to these operations, the STA 104 may enter a power saving mode indicated as sleep 212. The STA 104 may remain in the power saving mode/sleep 212 until the AP 102 transmits the AMPDU 214 (e.g., the next MU PPDU). FIG. 2 therefore shows the opportunity for STA 104 to enter a power saving mode given that it is the first STA in the MU-MIMO STA group to send a BlockACK (and possibly RD data) for a current MU PPDU.

The operation of STA 106 is described next. The STA 106 can represent any STA within a network that is neither the first STA nor the last STA in the MU-MIMO group to be requested to send a BlockACK. Under such a scenario, the STA 106 can enter a power saving mode indicated as sleep 216 after receiving the AMPDU 204. The STA 106 can remain in the power saving mode/sleep 216 until the AP 102 sends a Block Acknowledgement Request (BlockACKReq; represented as "BAR") 212 with or without an RD grant to the STA 106. The BAR 212 can also include quality of service (QoS) null data. In response to the BAR+QoS null data 212, the STA 106 can transmit a BlockACK with any RD data if granted RD data from the AP 102 (BlockACK and RD data shown together as "BACK 1+RD DATA" element 214). The STA 106 can then receive a BlockACK 216 from the AP 102. The STA 106 may then enter another power saving mode indicated as sleep 218 until the AP 102 transmits the AMPDU 220 (e.g., the next MU PPDU). FIG. 2 therefore shows the opportunity for STA 106 to enter a power saving mode given that it is neither the first nor the last STA in the MU-MIMO STA group to send a BlockACK (and possibly RD data) for a current MU PPDU.

The operation of STA 108 is described next. The STA 108 can represent the last STA in the MU-MIMO group to be requested to send a BlockACK. Under such a scenario, the STA 108 can enter a power saving mode indicated as sleep 222 after receiving the AMPDU 206. The STA 108 can remain in the power saving mode/sleep 222 until the AP 102 sends a BlockACKReq 224 with or without an RD grant to the STA 108. The BAR 224 can also include quality of service (QoS) null data. In response to the BAR+QoS null data 224, the STA 108 can transmit a BlockACK with any RD data if granted RD data from the AP 102 (BlockACK and RD data shown together as "BACK 1+RD DATA" element 226). The STA 108 can remain active to receive an acknowledgement from the AP 102 if necessary (not shown in FIG. 2 for simplicity) and can also remain active to receive AMPDU 228 (e.g., the next MU PPDU). FIG. 2 therefore shows the opportunity for STA 108 to enter a power saving mode given that it is the last STA in the MU-MIMO STA group to send a BlockACK (and possibly RD data) for a current MU PPDU.

Techniques provided herein enable the MU-MIMO destination STAs 104-108 to enter a power saving mode according to any of the three scenarios described above in relation to FIG. 2—for STAs that are the first to transmit a BlockACK, for STAs that are the last to transmit a BlockACK, or for STAs that are neither the first nor the last to transmit a BlockACK for a current MU PPDU. The techniques provided herein ensure that each STA 104-108 is provided with the following information: (1) the order in which the STAs 104-108 will be requested for BlockACK from the AP 102; (2) for each of the STAs 104-108 that will be requested for BlockACK from the AP 102, whether RD will be granted; and (3) for each of the STAs 104-108 that will be granted RD, the duration or amount of time that will be given for providing the RD response burst.

In various embodiments, the order in which the STAs 104-108 will be requested for BlockACK from the AP 102 can be indicated using an enhanced directional multi-gigabit (EDMG) Header A (and/or EDMG Header B) of an MU PPDU. In the EDMG Header A, the association identifiers (AIDs) of all the addressed STAs in the MU-MIMO group can be listed (e.g., the AIDs corresponding to the STA 104-108). In various embodiments, eight AIDs can be included in the EDMG Header A, corresponding to a maximum MU-MIMO group size. In various embodiments, the AP 102 may not request BlockACKs from all the addressed STAs. Accordingly, eight bits (e.g., one byte) of BACK indication in EDMG Header A and/or EDMG Header B, with each bit corresponding to an AID, can be used to indicate whether the STA will be requested BlockACK for a current MU PPDU.

Figure 3:
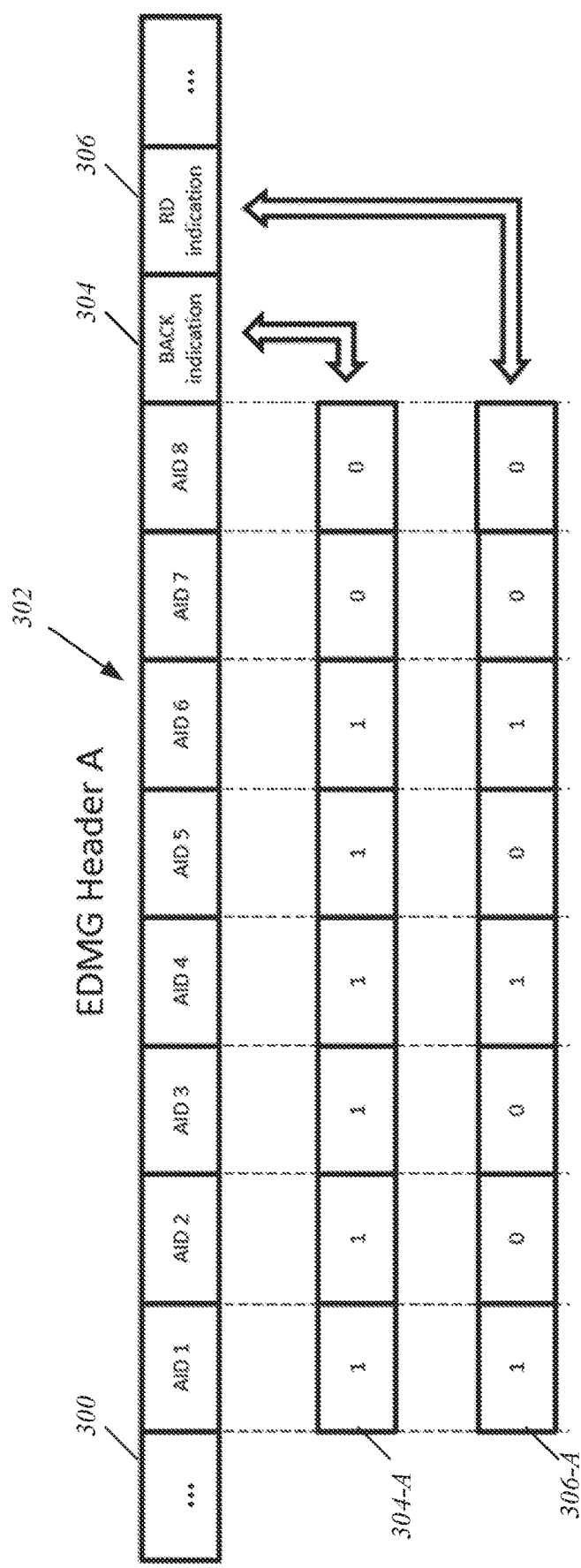
FIG. 3 illustrates an exemplary data frame.

FIG. 3 illustrates an exemplary data frame 300 according to various embodiments. The data frame can be an EDMG Header A. The EDMG Header A 300 can be prepared or generated by the STA 102. As shown in FIG. 3, the EDMG Header A 300 includes the AIDs 302 for the maximum number of STAs that can be in a MU-MIMO group. The AIDs 302 for the STAs are listed sequentially. The EDMG Header A 300 further includes a BACK indication 304. The bit-by-bit breakdown of the BACK indication 304 is shown by the sequential bit listing 304-A (e.g., comprising 1 byte or 8 bits). The bit-by-bit breakdown 304-A of the BACK indication 304 corresponds to the sequential listing of AIDs—for example, such that AID 1 corresponds to the first bit position in bit listing 304-A, AID 2 corresponds to the second bit position in bit listing 304-A, etc.

A "1" in the BACK indication 304 indicates that a corresponding STA (linked by the AID 302) will be requested for a BlockACK from the AP 102 with the sequential listing of the AIDs 302 indicating the order in which they will be requested. For the exemplary EDMG Header A 300 of FIG. 3, AIDs 1-6 will be requested for BlockACK with respect to a current MU PPDU, while AIDs 7-8 will not be requested for BlockACK. Further, the AIDs 1-6 will be requested in the order listed in the breakdown 304-A (i.e., sequentially).

In various embodiments, the AP 102 may not grant RD to each of the STAs in the MU-MIMO group. Accordingly, in various embodiments, a second portion of the EDMG Header A can be used to indicate whether a particular STA will be granted RD. The second portion can also be a byte (e.g., 8 bits) with each bit corresponding to a particular AID. A "1" can indicate that RD is granted for a particular AID and a "0" can indicate that RD is not granted. Overall, each bit in the additional byte corresponding to an AID will indicate whether the STA will be granted RD for a current MU PPDU. Note that an MU-MIMO destination STA shall not be granted RD when it is not requested by the AP 102 for BlockACK.

FIG. 3 illustrates the EDMG Header A 300 that includes an RD indication 306. The RD indication 306 can be a field that is part of the EDMG Header A 300. The RD indication 306 can be a byte positioned after the BACK indication byte 304. A bit-by-bit breakdown 306-A of the RD indication is also shown in FIG. 3. For the RD indication 306, as discussed above, each bit field corresponds to a particular STA AID 302. Further, a "1" positioned in the bit field of 306-A can indicate RD will be granted to the STA having the corresponding AID 302. A "0" positioned in the bit field of 306-A can indicate RD will not be granted to the STA having the corresponding AID 302. Note in the exemplary EDMG Header A 300, AID 1, AID 4, and AID 6 will be granted RD. Further, note that AIDs 7-8 are not granted RD since these AIDs are not requested for BlockACK. In various embodiments, if the EDMG Header A 300 does not have enough bits left for the BACK indication byte 304 and RD indication byte 306, then an EDMG Header B can be used to provide one or both of these indicators.

In various embodiments, the BACK indication and the RD indication can be provided by a management frame that can include the BACK indication and RD indication bytes illustrated above (e.g., the BACK indication 304/304-A and the RD indication 306/306-A). For each MU PPDU, the AP 102 can aggregate this management frame to the AMPDUs that are addressed to the MU-MIMO destination STAs (e.g., AMPDUs 202-206). Once an MU-MIMO destination STA receives the MU PPDU, the STA can determine which AIDs are going to be requested for BlockACK and which AIDs are going to be granted RD by referring to the AID order indicated in the EDMG Header A.

In various embodiments, the AP 102 can announce the duration of the RD response burst for each MU-MIMO destination STA to all MU-MIMO group members before the AP 102 collects BlockACK and RD data for an MU PPDU. The duration of the RD responder burst for each MU-MIMO destination STA can be included, for example, in the EDMG Header A 300 or an EDMG Header B. Alternatively, the duration of the RD responder burst can be provided by any other technique that distributes the RD duration information to all members of the MU-MIMO group. As an example, the RD duration information can be included in one or more MU-MIMO setup frames provided ahead of, or at the beginning of, an MU-MIMO transmission opportunity (TXOP).

An MU-MIMO destination STA that is provided with the information described above—that is, (1) the order of STAs that the AP 102 will request for BlockACK; (2) whether RD will be granted to a particular STA; and (3) the duration for transmitting any RD responder burst—can subsequently determine when it should be active and when it can enter a power saving mode. To facilitate a determination of how long to enter a power save mode and when to enter and exit a power saving mode, in various embodiments, an STA can assume BlockACK and BlockACKReq+QoS Null transmissions will be sent using modulation coding scheme (MCS) 4 as specified in 802.11ay. Further, an STA can assume use of the shortest bitmap length of BlockACK when calculating the duration of a BlockACK transmission.

In various embodiments, three different options can be provided to an STA in determining whether to enter a power saving mode during the RD transmissions of other STAs. As a first exemplary option, an STA may enter power saving mode during the RD transmissions of other STAs. This option can ensure the longest power saving time for an STA but may rely on (1) that the AP 102 has an accurate estimation so that each RD responder has enough RD data to transmit during its assigned duration of RD responder burst; and (2) that an MU-MIMO destination STA will occupy the channel until the end of the RD responder burst duration that it was assigned by the AP 102.

As a second exemplary option, an STA does not enter power saving mode during the RD transmissions of other STAs. This option does not rely on an accurate estimation on RD duration from the AP 102 and allows the AP 102 to take over the channel once the RD responder finishes its RD response burst. This option provides the shortest power saving time, but may be less complicated than the first option. Further, when an STA operates under option 2, it can be assured that the STA will always wakeup in time and will not miss any information transmitted to it by the AP 102.

As a third exemplary option, an STA may enter power saving mode for a portion of the RD transmissions of the other STAs. The portion can be a percentage (e.g., X % of the duration). The determined percentage can implementation specific, can vary across each STA, and can vary over time for any particular STA. This option can provide for more power saving opportunities compared to option 2 while relying on less accuracy on RD duration estimation when compared to option 1. Further, this option also allows for the AP 102 to take over the channel once an RD responder has completed its RD data transmission.

Based on the techniques described herein, an STA (e.g., one of the STAs 104-108) can determine whether it will be the first, last, or neither the first or last STA to be requested to transmit a BlockACK for a current MU PPDU—for example, based on information provided in an EDMG Header (e.g., EDMG Header A 300). Further, an STA can determine if it is granted an opportunity to transmit RD data (e.g., based on information provided in the EDMG Header A 300) as well as a duration of a RD burst. Once provided with this information, an STA can subsequently determine when to enter a power saving mode based on one of the three options discussed above such that the STA can exit the power saving mode/wake-up to receive a BlockACKReq, a BlockACKReq+QoS-Null transmission, or a next MU-PPDU.

In various embodiments, the techniques described herein for an MU-MIMO group STA to determine when to enter a power saving mode can be used in the case of MU-MIMO transmission without RD. When RD is not provided, the AP 102 may not estimate a RD response burst duration for each destination STA. Further, the RD indication 306 may be set to all "0"s or may be excluded in the EDMG Header A or EDMG Header B. Additionally, an STA can use option 2 described above to calculate its sleeping time(s) and wakeup time(s).

In various embodiments, the WCDs 102-108 can transmit data or information as part of a data message, frame, or signal over a wireless carrier. In various embodiments, any data message, frame, or signal can be transmitted and received wirelessly according to 802.11ay. The EDMG Header A depicted in FIG. 3 (as well as an EDMG Header B or any other management or data frame described herein) can be a portion or data message, a signal, or frame. As an example, the listing of AIDs 102, the BACK indication field 304, and the RD indication field 306 (and the duration information regarding each RD burst) can be part of a message, signal, or frame that forms part of the EDMG Header A and/or part of the EDMG Header B or any other management or setup frame.

Figure 4:
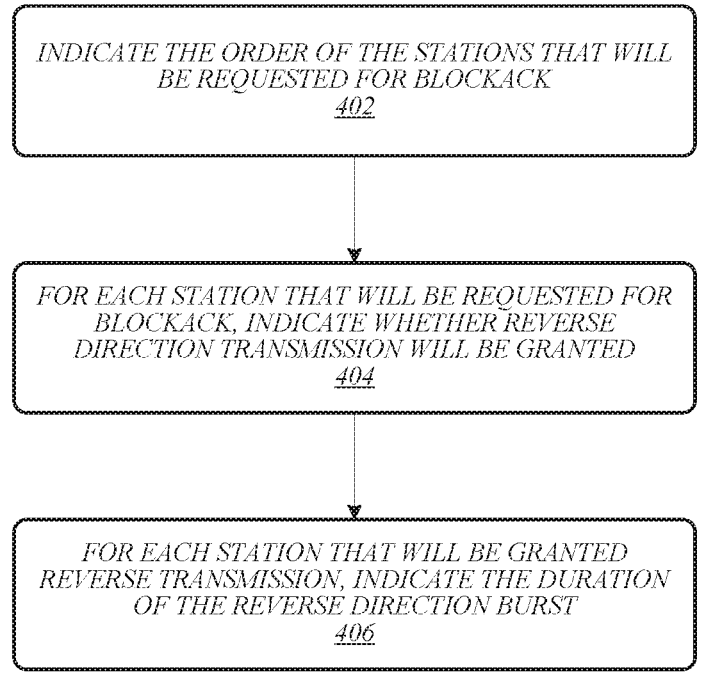
FIG. 4 illustrates an embodiment of a first logic flow.

FIG. 4 illustrates an example of a logic flow 400 that may be representative of the operation of an AP/PCP according to various embodiments. For example, logic flow 400 may be representative of operations that may be performed in various embodiments by wireless communication device 102 in operating environment 100 of FIG. 1 when operating as an AP/PCP in an 802.11ay network. Logic flow 400 may be representative of an AP/PCP 802.11ay device that generates and transmits the exemplary data frame 300 of FIG. 3 to a group of MU-MIMO STAs (e.g., the STAs 104-108 of FIG. 1).

As shown in FIG. 4, at 402, the AP/PCP can indicate the order that the STAs in the group will be requested to transmit a BlockACK. The BlockACK can be requested to be sent in response to an MU PPDU. The order can be indicated based on the data frame 300. In particular, the AP/PCP can generate the data frame 300 (e.g., an EDMG Header A 300) to indicate the order based on the listing of AIDs 302 and the BACK indication 304. The listing of AIDs can be a sequential listing of the AIDs for each of the STAs in the group. The BACK indication can include a bit sequence with each bit position corresponding to one of the AIDs in the listing of the AIDs. In the BACK indication, a "1" value in a bit position can indicate that a BlockACK will be requested from the STA associated with the AID corresponding to the bit position. A "0" value in a bit position can indicate that a BlockACK will not be requested from the STA associated with AID corresponding to the bit position. Based on the listing of AIDs and the corresponding BACK indication bits, the STAs that will be requested to send a BlockACK and the order in which the STAs will be requested to send the BlockACK can be provided. Overall, the bit position of each bit in the BACK indication can corresponding to a particular AID of a STA while the bit value can indicate whether a BlockACK will be requested for that particular STA corresponding to the AID.

At 404, for each STA that will be requested to send a BlockACK, the AP/PCP can indicate which of these STAs will be granted an RD transmission. The RD grants can be indicated using the data frame 300. In particular, the grant can be indicated using an RD indication field in the EDMG Header A 300. The RD indication can include a bit sequence with each bit position corresponding to one of the AIDs in the listing of the AIDs. In the RD indication, a "1" value in a bit position can indicate that RD transmission will be granted to the STA that corresponds the AID associated with that bit position. A "0" value in the bit position can indicate that an RD transmission will not be granted to the STA that corresponds to the AID associated with that bit position.

For 402 and 404, the listing of AIDs for the STAs in the group can be sequential (i.e., in order from AID 1, AID 2, . . . AID 8). The listing of AIDs can have a maximum number of included AID fields (e.g., a maximum of eight). Further, the BACK indication and RD indication fields can include a number of bit fields that match the maximum number of possible AIDs (e.g., eight bits or 1 byte). The sequential listing of the bits in the BACK indication filed and the RD indication filed can correspond to the sequential listing of the AIDs. In this way, each STA can determine an order of the STAs, what STAs are to be expected to send a BlockACK, and what STAs are to be granted an RD transmission opportunity.

At 406, for each STA that will be granted an RD transmission opportunity, the AP/PCP can indicate the duration of the RD burst for each STA. The duration of an RD burst or transmission by a particular STA can be indicated in the data frame 300 (e.g., the EDMG Header A 300 or in an EDMG Header B). The duration of an RD burst or transmission by a particular STA can alternatively be indicted using one or more setup frames transmitted by the AP/PCP prior to transmission of an MU PPDU for which the indications are provided. The embodiments are not limited to these examples.

Figure 5:
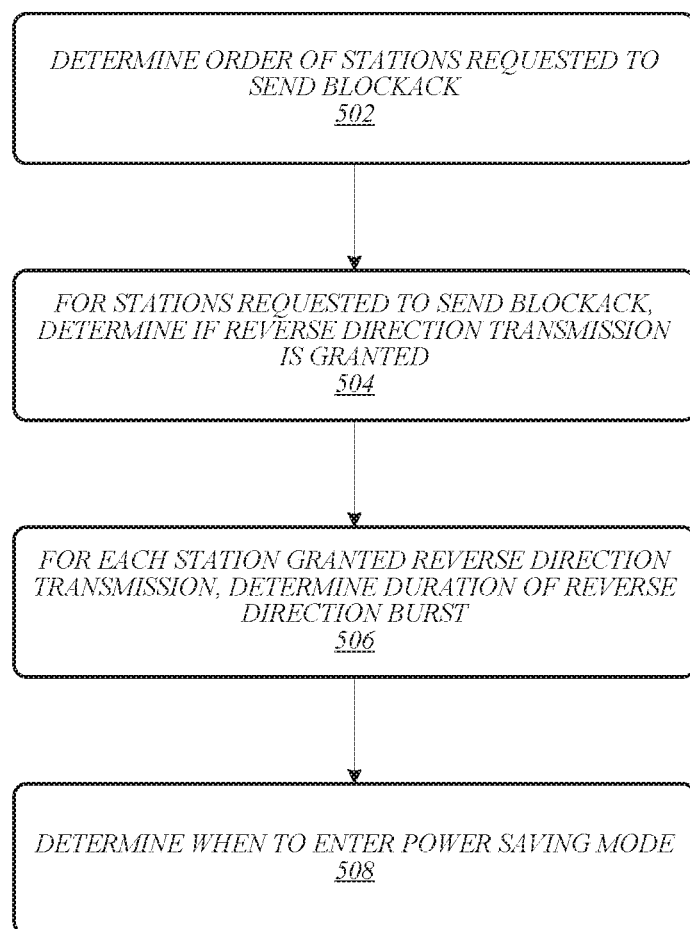
FIG. 5 illustrates an embodiment of a second logic flow.

FIG. 5 illustrates an example of a logic flow 500 that may be representative of the operation of an STA according to various embodiments. For example, logic flow 500 may be representative of operations that may be performed in various embodiments by one of the wireless communication devices 104-108 in operating environment 100 of FIG. 1 when operating as an STA in an 802.11ay network. Logic flow 500 may be representative of an STA 802.11ay device that receives and processes the exemplary data frame 300 of FIG. 3 from an AP/PCP (e.g., the AP/PCP 102 of FIG. 1).

As shown in FIG. 5, at 502 an order in which the STAs in an MU-MIMO group will be requested for BlockACK can be determined. As discussed above in relation to FIGS. 3 and 4, the order can be indicated using a listing of the AIDs of the STAs in conjunction with a BACK indication field. The listing of the AIDs and the BACK indication field can be provided in a data from provided to each STA—that is, transmitted by the AP/PCP and received and processed by each STA. Each STA can use the listing of AIDs and the BACK indication field to determine its order among the group of STAs as well as determine if the AP/PCP expects it to send a BlockACK in response to a current MU PPDU. The listing of the AIDs and the BACK indication can be provided in the EDMG Header A 300 or in an EDMG Header B as discussed above.

At 504, a determination can be made by each STA that is expected to send a BlockACK whether the STA will be granted an RD transmission. As discussed above in relation to FIGS. 3 and 4, the indication can be provided by an RD indication field. The RD indication field can specify whether a particular STA will be granted RD or not. The RD indication can be provided in the EDMG Header A 300 or in an EDMG Header B as discussed above.

At 506, a determination can be made by each STA that has been granted an RD transmission of the duration of the granted RD burst. The duration of each RD burst provided to the STAs granted an RD can be provided to all STAs. The duration information can be provided in in the EDMG Header A 300 or in an EDMG Header B as discussed above or can be provided in one or more setup frames transmitted by the AP/PCP prior to transmitting an MU PPDU.

At 508, each STA in the group of MU-MIMO STAs can have knowledge of (1) the order in which the STAs will be expected to provide a BlockACK, (2) which STAs will be granted RD, and (3) the duration of the RD burst for each STA granted RD. This knowledge can be provided based on the indications provided in 502-506. Based on this information, at 508, each STA can determine when to enter a power saving mode (e.g., when to enter a power saving mode and when to exit a power saving mode). As discussed above, each STA can determine when it should be active and when it can be in a sleep or low power mode based on entering a power saving mode during the RD transmissions of the other STAs (e.g., option 1 as described above), not entering a power saving mode during the RD transmissions of the other STAs (e.g., option 2 as described above), or entering a power saving mode for a portion of the RD transmissions of the other STAs (e.g., option 3 as described above).

Logic flow 500 enables a STA to determine whether it will be the first STA to be expected to send a BlockACK, the last STA to be expected to send a BlockACK, or some other order of STA other than the first or last STA to be expected to send a BlockACK for a current MU PPDU as described above in relation to FIG. 2. An STA can then determine when to enter a power saving mode (e.g., a sleep mode or a low power mode) and when to exit a power saving mode (e.g., when to wake up or become active) to ensure reception of a BlockACKReq transmission, a BlockACKReq+QoS-Null transmission, or a next MU PPDU. The embodiments are not limited to these examples.

Techniques described herein enable power saving during DL MU-MIMO transmissions with and without RD. Overall, the techniques enable an AP/PCP (e.g., the AP 102) to announce the RD duration of each MU-MIMO destination STA ahead of the AP/PCP collecting BlockACK and RD data from the STAs. By announcing the RD duration of each ATA, every MU-MIMO destination STA has the knowledge of RD duration for all the STAs in the MU-MIMO group. Further, the techniques enable the use of EDMG Headers in the MU PPDU or the use of an aggregated management frame in the MU PPDU to indicate the order of the STAs that will be requested for BlockACK, as well as the STAs that will be granted for RD. Based on this provided information, each MU-MIMO destination STA can calculate the time that is needed for each STA to send BlockACK and RD data before and after its own turn to send BlockACK and RD data. Based on this calculation, the MU-MIMO destination STAs can decide their power saving strategy during DL MU-MIMO transmissions (e.g., based on one of the three options described above).

Various embodiments of the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc. The embodiments are not limited in this context.

Figure 6:
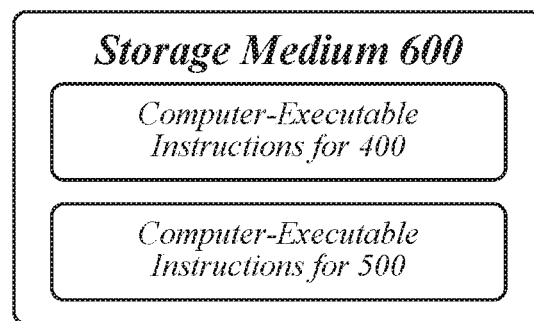
FIG. 6 illustrates an embodiment of a storage medium.

FIG. 6 illustrates an embodiment of a storage medium 600. Storage medium 600 may comprise any non-transitory computer-readable storage medium or machine-readable storage medium, such as an optical, magnetic or semiconductor storage medium. In various embodiments, storage medium 600 may comprise an article of manufacture. In some embodiments, storage medium 600 may store computer-executable instructions, such as computer-executable instructions to implement logic flow 400 of FIG. 4 and/or logic flow 500 of FIG. 5. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 7:
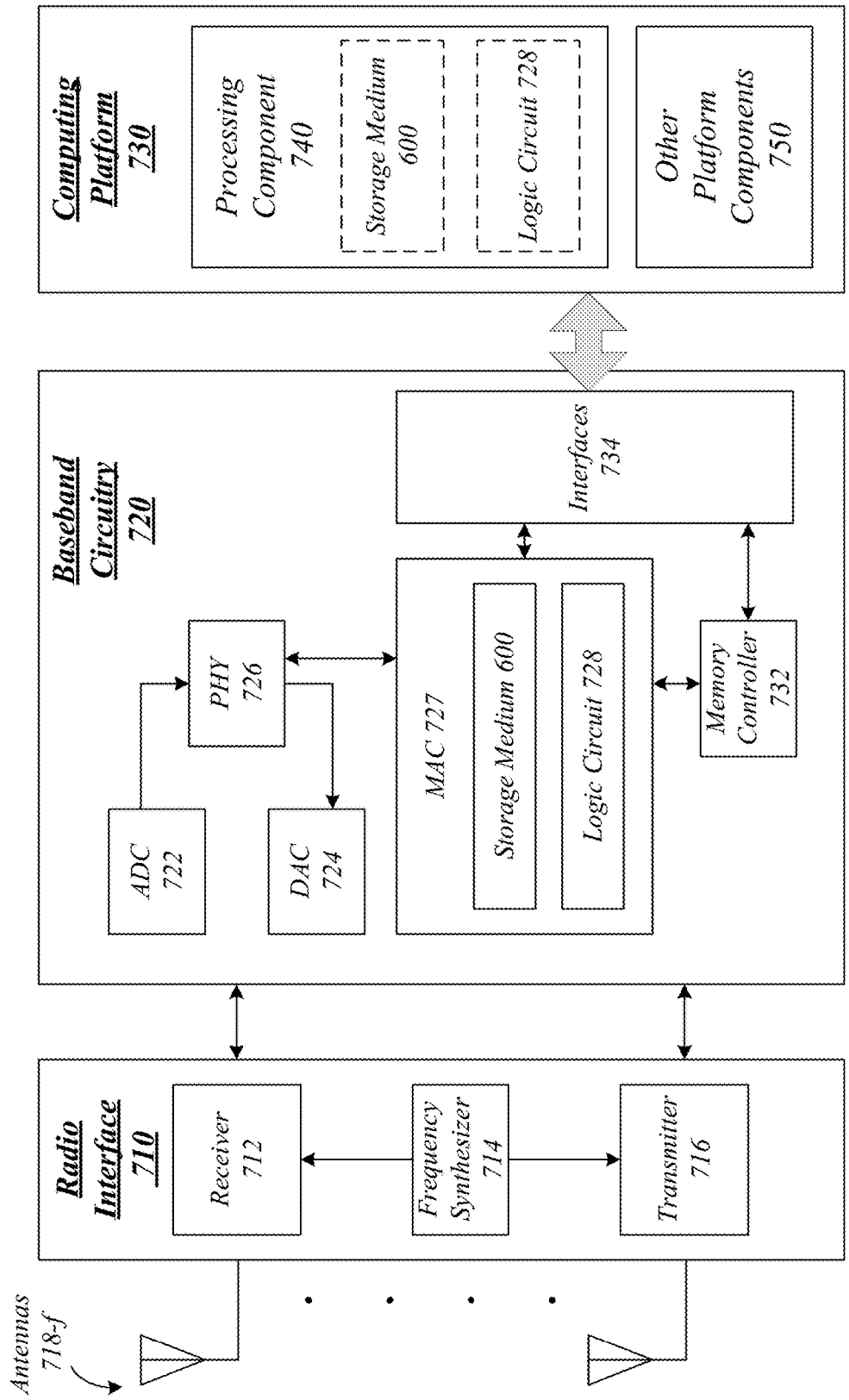
FIG. 7 illustrates an embodiment of a device.

FIG. 7 illustrates an embodiment of a communications device 700 that may implement one or more of wireless communication devices 102-108, logic flow 400, logic flow 500, and storage medium 600. In various embodiments, device 700 may comprise a logic circuit 728. The logic circuit 728 may include physical circuits to perform operations described for one or more of wireless communication devices 102-108, logic flow 400, and logic flow 500, for example. As shown in FIG. 7, device 700 may include a radio interface 710, baseband circuitry 720, and computing platform 730, although the embodiments are not limited to this configuration.

The device 700 may implement some or all of the structure and/or operations for one or more of wireless communication devices 102-108, logic flow 400, logic flow 500, storage medium 600, and logic circuit 728 in a single computing entity, such as entirely within a single device. Alternatively, the device 700 may distribute portions of the structure and/or operations for one or more of wireless communication devices 102-108, logic flow 400, logic flow 500, storage medium 600, and logic circuit 728 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 710 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 710 may include, for example, a receiver 712, a frequency synthesizer 714, and/or a transmitter 716. Radio interface 710 may include bias controls, a crystal oscillator and/or one or more antennas 718-f. In another embodiment, radio interface 710 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 720 may communicate with radio interface 710 to process receive and/or transmit signals and may include, for example, an analog-to-digital converter 722 for down converting received signals, a digital-to-analog converter 724 for up converting signals for transmission. Further, baseband circuitry 720 may include a baseband or physical layer (PHY) processing circuit 726 for PHY link layer processing of respective receive/transmit signals. Baseband circuitry 720 may include, for example, a medium access control (MAC) processing circuit 727 for MAC/data link layer processing. Baseband circuitry 720 may include a memory controller 732 for communicating with MAC processing circuit 727 and/or a computing platform 730, for example, via one or more interfaces 734.

In some embodiments, PHY processing circuit 726 may include a frame construction and/or detection module, in combination with additional circuitry such as a buffer memory, to construct and/or deconstruct communication frames. Alternatively or in addition, MAC processing circuit 727 may share processing for certain of these functions or perform these processes independent of PHY processing circuit 726. In some embodiments, MAC and PHY processing may be integrated into a single circuit.

The computing platform 730 may provide computing functionality for the device 700. As shown, the computing platform 730 may include a processing component 740. In addition to, or alternatively of, the baseband circuitry 720, the device 700 may execute processing operations or logic for one or more of wireless communication devices 102-108, logic flow 400, logic flow 500, storage medium 600, and logic circuit 728 using the processing component 740. The processing component 740 (and/or PHY 726 and/or MAC 727) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 730 may further include other platform components 750. Other platform components 750 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 700 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 700 described herein, may be included or omitted in various embodiments of device 700, as suitably desired.

Embodiments of device 700 may be implemented using single input single output (SISO) architectures. However, certain implementations may include multiple antennas (e.g., antennas 718-f) for transmission and/or reception using adaptive antenna techniques for beamforming or spatial division multiple access (SDMA) and/or using MIMO communication techniques.

The components and features of device 700 may be implemented using any combination of discrete circuitry, application specific integrated circuits (ASICs), logic gates and/or single chip architectures. Further, the features of device 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

In various embodiments, device 700 can be an AP/PCP or a STA of an 802.11ay network.

Figure 8:
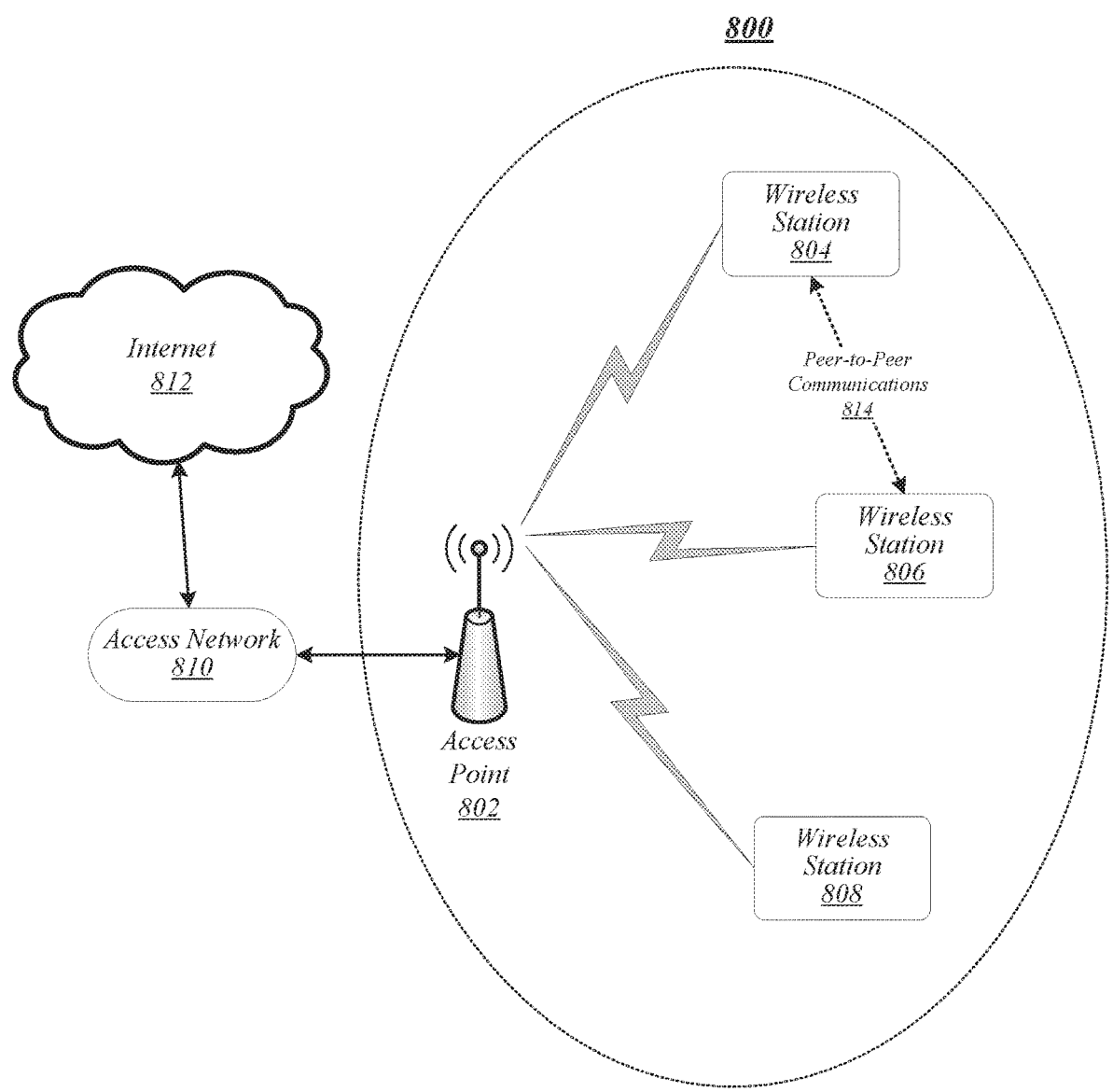
FIG. 8 illustrates an embodiment of a wireless network.

FIG. 8 illustrates an embodiment of a wireless network 800. As shown in FIG. 8, wireless network comprises an access point 802 and wireless stations 804, 806, and 808. In various embodiments, wireless network 800 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 800 may comprise another type of wireless network, and/or may implement other wireless communications standards. In various embodiments, for example, wireless network 800 may comprise a WWAN or WPAN rather than a WLAN. The embodiments are not limited to this example.

In various embodiments, the wireless network 800 is an 802.11ay network and can be a network in which the WCDs 102-108 operate.

In some embodiments, wireless network 800 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1×RTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 804, 806, and 808 may communicate with access point 802 in order to obtain connectivity to one or more external data networks. In some embodiments, for example, wireless stations 804, 806, and 808 may connect to the Internet 812 via access point 802 and access network 810. In various embodiments, access network 810 may comprise a private network that provides subscription-based Internet-connectivity, such as an Internet Service Provider (ISP) network. The embodiments are not limited to this example.

In various embodiments, two or more of wireless stations 804, 806, and 808 may communicate with each other directly by exchanging peer-to-peer communications. For example, in the example of FIG. 8, wireless stations 804 and 806 communicate with each other directly by exchanging peer-to-peer communications 814. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is an apparatus, comprising a memory and baseband circuitry coupled to the memory, the baseband circuitry to determine an order for a plurality of stations (STAs) comprised in a multiple-user multiple-input and multiple-output (MU-MIMO) STA group and generate a data message to be transmitted over a wireless carrier, the data message to comprise a listing of association identifiers (AIDs), each AID in the listing to correspond to a one of the plurality of STAs comprised in the MU-MIMO STA group, the listing to indicate an order of the STAs, a block acknowledgement (BACK) field to indicate the STAs to instruct to send a BACK, and a reverse direction (RD) field to indicate the STAs to instruct to send an RD transmission.

Example 2 is an extension of Example 1 or any other example disclosed herein, the listing of AIDs to include a sequential listing of the AIDs.

Example 3 is an extension of Example 1 or any other example disclosed herein, the BACK field to include a sequence of bits, each bit to correspond to a one of the AIDs in the listing of AIDs.

Example 4 is an extension of Example 3 or any other example disclosed herein, the sequence of bits to include 8 bits.

Example 5 is an extension of Example 3 or any other example disclosed herein, a first bit value to indicate an instruction to send the BACK and a second bit value to indicate an instruction to not send the BACK.

Example 6 is an extension of Example 1 or any other example disclosed herein, the RD field to include a sequence of bits, each bit to correspond to a one of the AIDs in the listing of AIDs.

Example 7 is an extension of Example 6 or any other example disclosed herein, the sequence of bits to include 8 bits.

Example 8 is an extension of Example 6 or any other example disclosed herein, a first bit value to indicate an instruction to send the RD transmission and a second bit value to indicate an instruction to not send the RD transmission.

Example 9 is an extension of Example 1 or any other example disclosed herein, the data message to comprise an enhanced multi-gigabit (EDMG) Header A, the EDMG Header A to include at least one of the listing of AIDs, the BACK field, and the RD field.

Example 10 is an extension of Example 9 or any other example disclosed herein, the data message to comprise an EDMG Header B, the EDMG Header B to include at least one of the BACK field and the RD field.

Example 11 is an extension of Example 1 or any other example disclosed herein, the baseband circuitry to generate an indication of a duration of the RD transmission for each STA.

Example 12 is an extension of Example 11 or any other example disclosed herein, the baseband circuitry to generate an EDMG Header A to include the indication of the duration of the RD transmission for each STA.

Example 13 is an extension of Example 11 or any other example disclosed herein, the baseband circuitry to generate an EDMG Header B to include the indication of the duration of the RD transmission for each STA.

Example 14 is an extension of Example 11 or any other example disclosed herein, the baseband circuitry to generate a setup data frame to include the indication of the duration of the RD transmission for each STA.

Example 15 is an extension of any of Examples 1 to 14 or any other example disclosed herein, the apparatus comprising at least one radio frequency (RF) transceiver and at least on RF antenna.

Example 16 is a wireless communication method, comprising determining an order for a plurality of stations (STAs) comprised in a multiple-user multiple-input and multiple-output (MU-MIMO) STA group and generating a data message to be transmitted over a wireless carrier, the data message to comprise a listing of association identifiers (AIDs), each AID in the listing to correspond to a one of the plurality of STAs comprised in the MU-MIMO STA group, the listing to indicate an order of the STAs, a block acknowledgement (BACK) field to indicate the STAs to instruct to send a BACK, and a reverse direction (RD) field to indicate the STAs to instruct to send an RD transmission.

Example 17 is an extension of Example 16 or any other example disclosed herein, the listing of AIDs to include a sequential listing of the AIDs.

Example 18 is an extension of Example 16 or any other example disclosed herein, the BACK field to include a sequence of bits, each bit to correspond to a one of the AIDs in the listing of AIDs.

Example 19 is an extension of Example 18 or any other example disclosed herein, the sequence of bits to include 8 bits.

Example 20 is an extension of Example 18 or any other example disclosed herein, a first bit value to indicate an instruction to send the BACK and a second bit value to indicate an instruction to not send the BACK.

Example 21 is an extension of Example 15 or any other example disclosed herein, the RD field to include a sequence of bits, each bit to correspond to a one of the AIDs in the listing of AIDs.

Example 22 is an extension of Example 21 or any other example disclosed herein, the sequence of bits to include 8 bits.

Example 23 is an extension of Example 21 or any other example disclosed herein, a first bit value to indicate an instruction to send the RD transmission and a second bit value to indicate an instruction to not send the RD transmission.

Example 24 is an extension of Example 16 or any other example disclosed herein, the data message to comprise an enhanced multi-gigabit (EDMG) Header A, the EDMG Header A to include at least one of the listing of AIDs, the BACK field, and the RD field.

Example 25 is an extension of Example 24 or any other example disclosed herein, the data message to comprise an EDMG Header B, the EDMG Header B to include at least one of the BACK field and the RD field.

Example 26 is an extension of Example 16 or any other example disclosed herein, generating an indication of a duration of the RD transmission for each STA.

Example 27 is an extension of Example 26 or any other example disclosed herein, generating an EDMG Header A to include the indication of the duration of the RD transmission for each STA.

Example 28 is an extension of Example 26 or any other example disclosed herein, generating an EDMG Header B to include the indication of the duration of the RD transmission for each STA.

Example 29 is an extension of Example 26 or any other example disclosed herein, generating a setup data frame to include the indication of the duration of the RD transmission for each STA.

Example 30 is a least one computer-readable storage medium comprising a set of instructions that, in response to being executed on a computing device, cause the computing device to perform a wireless communication method according to any of Examples 16 to 29 or any other example disclosed herein.

Example 31 is an apparatus, comprising means for performing a wireless communication method according to any of Examples 16 to 29 any other example disclosed herein.

Example 32 is at least one non-transitory computer-readable medium comprising a set of instructions that, in response to being executed at a wireless communication device, cause the wireless communication device to determine an order for a plurality of stations (STAs) comprised in a multiple-user multiple-input and multiple-output (MU-MIMO) STA group and generate a data message to be transmitted over a wireless carrier, the data message to comprise a listing of association identifiers (AIDs), each AID in the listing to correspond to a one of the plurality of STAs comprised in the MU-MIMO STA group, the listing to indicate an order of the STAs, a block acknowledgement (BACK) field to indicate the STAs to instruct to send a BACK, and a reverse direction (RD) field to indicate the STAs to instruct to send an RD transmission.

Example 33 is an extension of Example 32 or any other example disclosed herein, the listing of AIDs to include a sequential listing of the AIDs.

Example 34 is an extension of Example 32 or any other example disclosed herein, the BACK field to include a sequence of bits, each bit to correspond to a one of the AIDs in the listing of AIDs.

Example 35 is an extension of Example 34 or any other example disclosed herein, the sequence of bits to include 8 bits.

Example 36 is an extension of Example 34 or any other example disclosed herein, a first bit value to indicate an instruction to send the BACK and a second bit value to indicate an instruction to not send the BACK.

Example 37 is an extension of Example 32 or any other example disclosed herein, the RD field to include a sequence of bits, each bit to correspond to a one of the AIDs in the listing of AIDs.

Example 38 is an extension of Example 37 or any other example disclosed herein, the sequence of bits to include 8 bits.

Example 39 is an extension of Example 37 or any other example disclosed herein, a first bit value to indicate an instruction to send the RD transmission and a second bit value to indicate an instruction to not send the RD transmission.

Example 40 is an extension of Example 32 or any other example disclosed herein, the data message to comprise an enhanced multi-gigabit (EDMG) Header A, the EDMG Header A to include at least one of the listing of AIDs, the BACK field, and the RD field.

Example 41 is an extension of Example 40 or any other example disclosed herein, the data message to comprise an EDMG Header B, the EDMG Header B to include at least one of the BACK field and the RD field.

Example 42 is an extension of Example 32 or any other example disclosed herein, the baseband circuitry to generate an indication of a duration of the RD transmission for each STA.

Example 43 is an extension of Example 42 or any other example disclosed herein, comprising instructions that, in response to being executed on the wireless communication device, cause the wireless communication device to generate an EDMG Header A to include the indication of the duration of the RD transmission for each STA.

Example 44 is an extension of Example 42 or any other example disclosed herein, comprising instructions that, in response to being executed on the wireless communication device, cause the wireless communication device to generate an EDMG Header B to include the indication of the duration of the RD transmission for each STA.

Example 45 is an extension of Example 42 or any other example disclosed herein, comprising instructions that, in response to being executed on the wireless communication device, cause the wireless communication device to generate a setup data frame to include the indication of the duration of the RD transmission for each STA.

Example 46 is an apparatus, comprising a memory and baseband circuitry coupled to the memory, the baseband circuitry to process a listing of association identifiers (AIDs), each AID corresponding to a one of a plurality of stations (STAs) comprised in a multiple-user multiple-input and multiple-output (MU-MIMO) STA group, to determine an order of the plurality of STAs, process a block acknowledgement (BACK) field to determine the STAs instructed to send a BACK based on the determined order of the plurality of STAs, process a reverse direction (RD) field to determine the STAs instructed to send an RD transmission, determine a duration of the RD transmission of each STA, and determine a time to operate in a power saving mode based on the determined order of the STAs instructed to send a BACK, the determined STAs instructed to send the RD transmission, and the determined duration of the RD transmissions.

Example 47 is an extension of Example 46 or any other example disclosed herein, the listing of AIDs to include a sequential listing of the AIDs.

Example 48 is an extension of Example 46 or any other example disclosed herein, the BACK field to include a sequence of bits, each bit to correspond to one of the AIDs in the listing of AIDs.

Example 49 is an extension of Example 48 or any other example disclosed herein, the sequence of bits to include 8 bits.

Example 50 is an extension of Example 48 or any other example disclosed herein, a first bit value to indicate an instruction to send the BACK and a second bit value to indicate an instruction to not send the BACK.

Example 51 is an extension of Example 46 or any other example disclosed herein, the RD field to include a sequence of bits, each bit to correspond to one of the AIDs in the listing of AIDs.

Example 52 is an extension of Example 51 or any other example disclosed herein, the sequence of bits to include 8 bits.

Example 53 is an extension of Example 51 or any other example disclosed herein, a first bit value to indicate an instruction to send the RD transmission and a second bit value to indicate an instruction to not send the RD transmission.

Example 54 is an extension of Example 46 or any other example disclosed herein, an enhanced multi-gigabit (EDMG) Header A to include the listing of AIDs and at least one of the BACK field and the RD field.

Example 55 is an extension of Example 54 or any other example disclosed herein, the EDMG Header A to include the duration of the RD transmission of each STA.

Example 56 is an extension of Example 46 or any other example disclosed herein, an EDMG Header B to include at least one of the BACK field and the RD field.

Example 57 is an extension of Example 56 or any other example disclosed herein, the EDMG Header B to include the duration of the RD transmission of each STA.

Example 58 is an extension of Example 46 or any other example disclosed herein, the determined time to operate in the power saving mode based on operating in the power saving mode during the RD transmissions of the STAs.

Example 59 is an extension of Example 46 or any other example disclosed herein, the determined time to operate in the power saving mode based on not operating in the power saving mode during the RD transmissions of the STAs.

Example 60 is an extension of Example 46 or any other example disclosed herein, the determined time to operate in the power saving mode based on operating in the power saving mode during a portion of the RD transmission of the STAs.

Example 61 is an extension of any of Examples 46 to 60 or any other example disclosed herein, comprising at least one radio frequency (RF) transceiver and at least on RF antenna.

Example 62 is a wireless communication method, comprising processing a listing of association identifiers (AIDs), each AID corresponding to a one of a plurality of stations (STAs) comprised in a multiple-user multiple-input and multiple-output (MU-MIMO) STA group, to determine an order of the plurality of STAs, processing a block acknowledgement (BACK) field to determine the STAs instructed to send a BACK based on the determined order of the plurality of STAs, processing a reverse direction (RD) field to determine the STAs instructed to send an RD transmission, determining a duration of the RD transmission of each STA, and determining a time to operate in a power saving mode based on the determined order of the STAs instructed to send a BACK, the determined STAs instructed to send the RD transmission, and the determined duration of the RD transmissions.

Example 63 is an extension of Example 62 or any other example disclosed herein, the listing of AIDs to include a sequential listing of the AIDs.

Example 64 is an extension of Example 62 or any other example disclosed herein, the BACK field to include a sequence of bits, each bit to correspond to one of the AIDs in the listing of AIDs.

Example 65 is an extension of Example 64 or any other example disclosed herein, the sequence of bits to include 8 bits.

Example 66 is an extension of Example 64 or any other example disclosed herein, a first bit value to indicate an instruction to send the BACK and a second bit value to indicate an instruction to not send the BACK.

Example 67 is an extension of Example 62 or any other example disclosed herein, the RD field to include a sequence of bits, each bit to correspond to one of the AIDs in the listing of AIDs.

Example 68 is an extension of Example 67 or any other example disclosed herein, the sequence of bits to include 8 bits.

Example 69 is an extension of Example 67 or any other example disclosed herein, a first bit value to indicate an instruction to send the RD transmission and a second bit value to indicate an instruction to not send the RD transmission.

Example 70 is an extension of Example 62 or any other example disclosed herein, an enhanced multi-gigabit (EDMG) Header A to include the listing of AIDs and at least one of the BACK field and the RD field.

Example 71 is an extension of Example 70 or any other example disclosed herein, the EDMG Header A to include the duration of the RD transmission of each STA.

Example 72 is an extension of Example 62 or any other example disclosed herein, an EDMG Header B to include at least one of the BACK field and the RD field.

Example 73 is an extension of Example 72 or any other example disclosed herein, the EDMG Header B to include the duration of the RD transmission of each STA.

Example 74 is an extension of Example 62 or any other example disclosed herein, determining the time to operate in the power saving mode based on operating in the power saving mode during the RD transmissions of the STAs.

Example 75 is an extension of Example 62 or any other example disclosed herein, determining the time to operate in the power saving mode based on not operating in the power saving mode during the RD transmissions of the STAs.

Example 76 is an extension of Example 62 or any other example disclosed herein, determining the time to operate in the power saving mode based on operating in the power saving mode during a portion of the RD transmission of the STAs.

Example 77 is at least one computer-readable storage medium comprising a set of instructions that, in response to being executed on a computing device, cause the computing device to perform a wireless communication method according to any of Examples 62 to 76 or any other example disclosed herein.

Example 78 is an apparatus, comprising means for performing a wireless communication method according to any of Examples 62 to 76 or any other example disclosed herein.

Example 79 is at least one non-transitory computer-readable medium comprising a set of instructions that, in response to being executed at a wireless communication device, cause the wireless communication device to process a listing of association identifiers (AIDs), each AID corresponding to a one of a plurality of stations (STAs) comprised in a multiple-user multiple-input and multiple-output (MU-MIMO) STA group, to determine an order of the plurality of STAs, process a block acknowledgement (BACK) field to determine the STAs instructed to send a BACK based on the determined order of the plurality of STAs, process a reverse direction (RD) field to determine the STAs instructed to send an RD transmission, determine a duration of the RD transmission of each STA, and determine a time to operate in a power saving mode based on the determined order of the STAs instructed to send a BACK, the determined STAs instructed to send the RD transmission, and the determined duration of the RD transmissions.

Example 80 is an extension of Example 79 or any other example disclosed herein, the listing of AIDs to include a sequential listing of the AIDs.

Example 81 is an extension of Example 79 or any other example disclosed herein, the BACK field to include a sequence of bits, each bit to correspond to one of the AIDs in the listing of AIDs.

Example 82 is an extension of Example 81 or any other example disclosed herein, the sequence of bits to include 8 bits.

Example 83 is an extension of Example 81 or any other example disclosed herein, a first bit value to indicate an instruction to send the BACK and a second bit value to indicate an instruction to not send the BACK.

Example 84 is an extension of Example 79 or any other example disclosed herein, the RD field to include a sequence of bits, each bit to correspond to one of the AIDs in the listing of AIDs.

Example 85 is an extension of Example 84 or any other example disclosed herein, the sequence of bits to include 8 bits.

Example 86 is an extension of Example 84 or any other example disclosed herein, a first bit value to indicate an instruction to send the RD transmission and a second bit value to indicate an instruction to not send the RD transmission.

Example 87 is an extension of Example 79 or any other example disclosed herein, an enhanced multi-gigabit (EDMG) Header A to include the listing of AIDs and at least one of the BACK field and the RD field.

Example 88 is an extension of Example 87 or any other example disclosed herein, the EDMG Header A to include the duration of the RD transmission of each STA.

Example 89 is an extension of Example 79 or any other example disclosed herein, an EDMG Header B to include at least one of the BACK field and the RD field.

Example 90 is an extension of Example 87 or any other example disclosed herein, the EDMG Header B to include the duration of the RD transmission of each STA.

Example 91 is an extension of Example 79 or any other example disclosed herein, comprising instructions that, in response to being executed on the wireless communication device, cause the wireless communication device to determine the time to operate in the power saving mode based on operating in the power saving mode during the RD transmissions of the STAs.

Example 92 is an extension of Example 79 or any other example disclosed herein, comprising instructions that, in response to being executed on the wireless communication device, cause the wireless communication device to determine the time to operate in the power saving mode based on not operating in the power saving mode during the RD transmissions of the STAs.

Example 93 is an extension of Example 79 or any other example disclosed herein, comprising instructions that, in response to being executed on the wireless communication device, cause the wireless communication device to determine the time to operate in the power saving mode based on operating in the power saving mode during a portion of the RD transmission of the STAs.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus, comprising:
   a memory of a first station (STA); and
   processing circuitry of the first STA coupled to the memory, the processing circuitry to:
     generate a first multiple-user PHY protocol data unit (MU-PPDU) to communicate in a downlink (DL) multiple-user multiple-input and multiple-output (MU-MIMO) communication to initiate a reverse direction (RD) communication, the MU-PPDU comprising aggregated frames, the aggregated frames comprising a frame to request a block acknowledgement and a quality of service (QoS) frame comprising a grant for a RD communication;
     cause transmission of the first MU-PPDU to a second STA;
     process the reverse direction communication including a first block acknowledgement and data in response to the first MU-PPDU; and
     cause transmission of a second block acknowledgement to acknowledge the reverse direction communication.

2. The apparatus of claim 1, the first MU-PPDU comprising a bit of a reverse direction (RD) indication set to 1 to grant the RD communication.

3. The apparatus of claim 1, the first MU-PPDU comprising a Response Duration for a RD responder.

4. The apparatus of claim 1, the first MU-PPDU comprising an enhanced directional multigigabit (EDMG) Header A.

5. The apparatus of claim 4, the first STA comprising an access point and the second STA comprising an EDMG STA.

6. The apparatus of claim 1, wherein a block acknowledgement request frame and a QoS Null frame are aggregated in a MAC protocol data unit (MPDU) of the MU-PPDU.

7. The apparatus of claim 1, wherein the first STA is a personal basic service set (PBSS) control point (PCP).

8. The apparatus of claim 1, comprising:
   a transceiver; and
   one or more antennas coupled with the transceiver.

9. The apparatus of claim 8, the processing circuitry to cause transmission of the grant for the RD communication to the first STA via the transceiver and one or more antennas.

10. A non-transitory computer-readable storage medium, comprising a plurality of instructions, that when executed, enable processing circuitry to:
generate a first multiple-user PHY protocol data unit (MU-PPDU) to communicate in a downlink (DL) multiple-user multiple-input and multiple-output (MU-MIMO) communication to initiate a reverse direction (RD) communication, the MU-PPDU comprising aggregated frames, the aggregated frames comprising a frame to request a block acknowledgement and a quality of service (QoS) frame comprising a grant for a RD communication;
cause transmission of the first MU-PPDU to a second station (STA);
process the reverse direction communication including a first block acknowledgement and data in response to the first MU-PPDU; and
cause transmission of a second block acknowledgement to acknowledge the reverse direction communication.

11. The non-transitory computer-readable storage medium of claim 10, the first MU-PPDU comprising a Response Duration for a RD responder.

12. The non-transitory computer-readable storage medium of claim 10, the first MU-PPDU comprising an enhanced directional multigigabit (EDMG) Header A.

13. The non-transitory computer-readable storage medium of claim 10, a first STA comprising the processing circuitry is an access point and the second STA comprises an EDMG STA.

14. The non-transitory computer-readable storage medium of claim 10, wherein a block acknowledgement request frame and a QoS Null frame are aggregated in a MAC protocol data unit (MPDU) of the MU-PPDU.

15. An apparatus, comprising:
a memory of a first station (STA); and
processing circuitry of the first STA coupled to the memory, the processing circuitry to:
process a first multiple-user PHY protocol data unit (MU-PPDU) to communicate in a downlink (DL) multiple-user multiple-input and multiple-output (MU-MIMO) communication to initiate a reverse direction (RD) communication, wherein the MU-PPDU comprises aggregated frames, the aggregated frames comprising a frame to request a block acknowledgement and a quality of service (QoS) frame comprising a grant for a RD communication;
cause transmission of the reverse direction communication including a first block acknowledgement and data in response to reception of the first MU-PPDU; and
process a second block acknowledgement communicated to acknowledge the reverse direction communication.

16. The apparatus of claim 15, the first MU-PPDU comprising a bit of a reverse direction (RD) indication set to 1 to grant the RD communication.

17. The apparatus of claim 15, the first MU-PPDU comprising a Response Duration for a RD responder.

18. The apparatus of claim 15, the first MU-PPDU comprising an enhanced directional multigigabit (EDMG) Header A.

19. The apparatus of claim 18, the first MU-PPDU is received from an access point and the first STA is an EDMG STA.

20. The apparatus of claim 15, wherein a block acknowledgement request frame and a QoS Null frame are aggregated in a MAC protocol data unit (MPDU) of the MU-PPDU.

21. The apparatus of claim 15, comprising:
a transceiver; and
one or more antennas coupled with the transceiver.

22. A non-transitory computer-readable storage medium, comprising a plurality of instructions, that when executed, enable processing circuitry to:
process a first multiple-user PHY protocol data unit (MU-PPDU) to communicate in a downlink (DL) multiple-user multiple-input and multiple-output (MU-MIMO) communication to initiate a reverse direction (RD) communication, wherein the MU-PPDU comprises aggregated frames, the aggregated frames comprising a frame to request a block acknowledgement and a quality of service (QoS) frame comprising a grant for a RD communication;
cause transmission of the reverse direction communication including a first block acknowledgement and data in response to reception of the first MU-PPDU; and
process a second block acknowledgement communicated to acknowledge the reverse direction communication.

23. The non-transitory computer-readable storage medium of claim 22, the first MU-PPDU comprising a bit of a reverse direction (RD) indication set to 1 to grant the RD communication.

24. The non-transitory computer-readable storage medium of claim 22, the first MU-PPDU comprising a Response Duration for a RD responder.

25. The non-transitory computer-readable storage medium of claim 22, the first MU-PPDU comprising an enhanced directional multigigabit (EDMG) Header A.

26. The non-transitory computer-readable storage medium of claim 25, the first MU-PPDU is received from an access point and a first STA comprising the processing circuitry is an EDMG STA.

* * * * *